Figure 1:
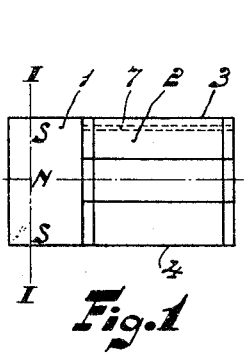

Dec. 25, 1956 J. J. P. VALETON ET AL 2,775,716
SYNCHRONOUS MOTOR COMPRISING AN ARMATURE
HAVING PERMANENT MAGNETIC POLES
Filed March 22, 1955

INVENTORS
JOSUE JEAN PHILIPPE VALETON
FRITS RUDOLF HARDI
FRANCISCUS HENRICUS JOZEF VAN DER POEL
BY
AGENT

United States Patent Office 2,775,716
Patented Dec. 25, 1956

2,775,716

SYNCHRONOUS MOTOR COMPRISING AN ARMATURE HAVING PERMANENT MAGNETIC POLES

Josue Jean Philippe Valeton, Frits Rudolf Hardi and Franciscus Henricus Josef van der Poel, Eindhoven, Netherlands, assignors to Hartford National Bank and Trust Company, Hartford, Conn., as trustee Application March 22, 1955, Serial No. 495,972

Claims priority, application Netherlands April 7, 1954

4 Claims. (Cl. 310—156)

One of the methods used in television for scanning films is the so-called light-spot scanning method. In the film projectors used in carrying out this method the maltese cross mechanism is omitted and the film is driven continuously at a constant rate of 25 frames per sec. in accordance with the television standard.

In carrying out this method three conditions have to be satisfied: the film movement and the image synchronizing pulses of the television signal must be in synchronism, they must be in correct phase relationship with one another and the film must start rapidly in from 1 to 2 seconds. When a synchronous motor is used for moving the film, the first requirement is satisfied (assuming the synchronizing pulses to be coupled to the mains) the other two, however, are not.

Use may, for example, be made of a synchronous motor having a speed of 1500 revolutions per minute (so that the rotor and the stator each have 4 poles) the four soft iron rotor poles (not excited) being provided with short-circuit bars with the result that the motor starts asynchronously. However, when using such a motor the phase of the rotor with respect to the mains is not determined unmistakably, since at the instant at which the rotor falls into synchronism a rotor pole may have either a north pole or a south pole induced in it. Thus, the rotor may assume four different positions relatively to the rotating field of the stator. However, in view of the interlaced scanning it is found that, if a determined position of this rotor is satisfactory, the position in which the rotor is displaced in phase through 360 electrical degrees is also satisfactory (in a four pole motor this corresponds to ½ revolution of the rotor, that is in terms of time $\frac{1}{50}$ sec).

The stator housing of the motor can in this event be adapted to rotate, so that if the motor starts in the wrong position it can be adjusted by rotating the stator housing through 180 electrical degrees (90° in direction). This method has a limitation in that it must be ascertained first whether the motor runs in the right or in the wrong position, after which it may be adjusted, if required.

According to the invention these disadvantages can be obviated by the use of a synchronous motor comprising an armature having permanent magnetic poles and characterized in that the armature also comprises a portion provided with a cage winding, which portion preferably comprises a number of a salient poles equal to the number of permanent magnetic poles.

Figure 2:
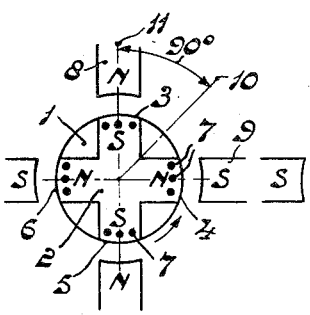
Figure 3:
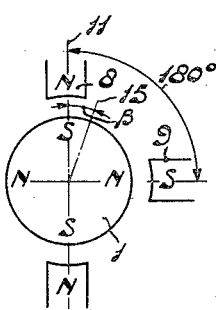
Figure 4:
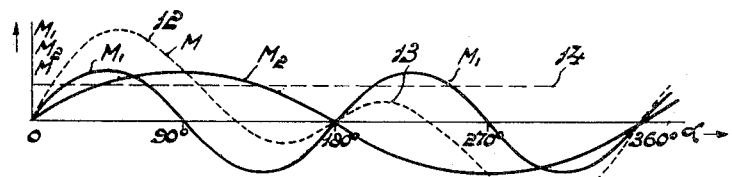
Figure 5:
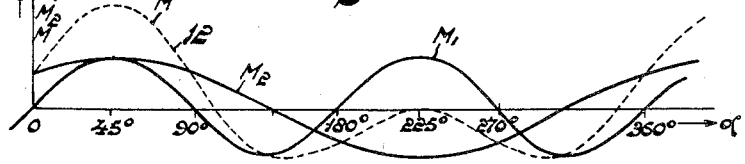

An embodiment of the invention given by way of example will now be described with reference to the accompanying diagrammatic drawing, in which Figs. 1, 2 and 3 are a front elevation, a side elevation of the right hand side and a cross-sectional view taken along the line I—I respectively of an armature of a synchronous motor in accordance with the invention, Figs. 4 and 5 are graphs in which the torques are plotted against the angular displacement between the rotor poles and stator poles.

Referring now to the figures, the armature comprises two portions, a portion 1 carrying four permanent magnetic poles N and S and a portion 2 comprising four salient poles 3 to 6 made of soft iron and carrying a cage winding the bars of which are designated 7. In the embodiment shown the permanent magnetic poles coincide with the soft iron poles, Figures 2 and 3 also show diagrammatically stator poles 8 and 9. These poles are provided in the usual manner with windings fed by alternating currents.

Rapid asynchronous starting of the motor until synchronism is reached is effected by the action of the cage winding.

The torque produced by the motor consists of the sum M of the torques $M_1$ supplied by material soft iron poles 3 to 6 and $M_2$ supplied by the permanent magnetic rotor poles N and S.

If instead of salient rotor poles a normal cage armature is used, the torque $M_1$ will be zero with synchronism and consequently will not contribute towards the drive. Therefore salient poles are preferably used which contribute towards the total torque M even in the case of synchronism.

In Fig. 4 torques $M_1$ and $M_2$ are shown as functions of the angular displacement $\alpha$ (in electrical degrees) between the rotor poles and the stator poles, it being assumed for the sake of simplicity that $M_1$ and $M_2$ have sinusoidal variations and equal amplitudes. The variation of $M_1$ and $M_2$ can be explained in a simple manner as follows.

Assuming that at a given instant the poles 8 form a north pole and the poles 9 form a south pile due to the action of the alternating supply voltage, in the position shown an S and a N pole will be induced in the soft iron poles 3 and 4 respectively. The torque $M_1$ is in this case equal to zero since there is no angular displacement between the rotor poles and the stator poles so that the arm of the torque is zero. Supposing the rotor to be rotated clockwise, i. e. to be braked against the direction of the rotation, the torque $M_1$ will increase to a maximum and again decrease until in the position 10 of the central line 11 the torque is again zero. In this position the soft iron pole 3 is equally acted upon by the pole 8 and by the pole 9 and consequently will have no polarity. The lines 10 and 11 are at an angle of 90 electrical degrees (45° in direction). In Fig. 4 consequently the torque $M_1$ passes through zero at 0 electrical degrees, attains a maximum value and at 90 electrical degrees again passes through zero (force=0), thereupon changes its direction, since when the rotor is rotated further to the right the pole 3 (Fig. 2) is acted upon by the S-pole 9, until at 180 electrical degrees precisely opposite the pole 9 the torque $M_1$ is again zero (arm=0).

The frequency of the torque $M_2$ is only half that of $M_1$. If in Fig. 3 the rotor is similarly rotated to the right, the torque $M_2$ of rotor pole S will increase to a maximum in the position precisely midway between the poles 8 and 9 and thereupon decrease until after 180 electrical degrees (90° in direction) in the position precisely opposite the pole 9 the torque is zero (arm=0). Consequently, in Fig. 4 the first passage through zero of $M_2$ is at 0 electrical degrees and the second at 180 electrical degrees. The passages through zero of $M_1$ and $M_2$ coincide at 0, 180, 360 electrical degrees and so on.

This is due to the fact that the permanent magnetic poles S and N coincide with the soft iron poles 3 to 6.

In Fig. 4 the total torque M as a function of $\alpha$ is obtained by the addition of $M_1$ and $M_2$. Consequently, since half a revolution of the rotor corresponds to 360 electrical degrees, at a given load torque two different peaks 12 and 13 of the torque curve M will be produced, the torque M being positive and increasing, but only a single peak 12 is preferred. If, as is shown by the line 14, the load torque of the motor exceeds the maximum value of the torque M in the peak 13, only the peak 12 will remain so that the requirements are satisfied. The motor starts rapidly enough and runs in synchronism while in addition the salient pole 3, for example, is always opposite the stator pole 8 when synchronism is attained.

However, if the load torque is less so that the line 14 intersects with the peak 13, the motor might still run in the wrong phase.

However, in such an event the positive peak 13 can be reduced and even completely smoothed out by increasing the strength of the field of the permanent magnets. Thus, the amplitude of the torque $M_2$ in Fig. 4 increases so that the amplitude of 13 decreases and may even fall to zero value.

However, if a cage armature motor is to be altered to obtain a motor in accordance with the invention and, consequently, part of the armature has to be removed to enable the permanent magnets to be added, such a measure is frequently not possible since the remainder of the cage armature is no longer capable of producing a sufficient starting torque for the required starting speed to be attained.

In this event the following solution can be used. In Fig. 5 the sinusoidal torque curve $M_2$ of the permanent magnets is shifted to the left through 45 electrical degrees.

As may be seen from the figure, the peak 13 has disappeared and only the positive peak 12 remains. This is due to the fact that the permanent magnetic poles S and N are displaced relatively to the soft iron rotor poles 3 to 6 so that the first passage through zero of $M_2$ is moved to the left through 45 electrical degrees with the result that the maximum amplitudes coincide. Consequently, the permanent magnetic poles are shifted against the direction of the rotation. Since 45 electrical degrees is ¼ of 180 electrical degrees this means a directional rotation of the permanent magnets of ¼×90°=22.5°, i. e. a rotation of the central line 11 in Fig. 3 to the position 15 in which the angle β is 22.5° directionally. In this case also the amplitude of $M_2$ may exceed that of $M_1$ since in this event in the point at 225 electrical degrees in Fig. 5 M even becomes negative and in the point at 45 electrical degrees becomes more positive.

The above can also be applied to motors having 2, 6, 8 etc. poles.

The motor in accordance with the invention can be used not only in television but also in film projectors in which the image is projected by means of light flashes and the pictures have to be in correct phase relationship with the flashes. This can be obtained by driving the film by means of the described motor.

What is claimed is:

1. A synchronous motor comprising an armature having a first portion provided with a number of permanent magnetic poles and a second portion provided with an equal number of salient poles, said salient poles having a cage winding and coinciding with said magnetic poles.

2. A synchronous motor as claimed in claim 1 wherein said permanent magnetic poles are shifted relatively to the salient poles through an angle such that the curve of the resulting torque from the various poles as a function of the angular displacement in electrical degrees of the armature relatively to the stator is highly positive only once every 360 electrical degrees.

3. A synchronous motor as set forth in claim 1 wherein the torque curve of the permanent magnetic poles as a function of the angular displacement in electrical degrees of the armature relatively to the stator poles at least has an amplitude equal to the amplitude of the torque curve of the salient poles.

4. A synchronous motor as set forth in claim 1 wherein the strength of the permanent magnetic poles is such that the resultant torque curve is highly positive only once every 360 electrical degrees.

References Cited in the file of this patent
UNITED STATES PATENTS

| | | |
|---|---|---|
| 1,283,432 | Warren | Oct. 29, 1918 |
| 1,788,812 | Toewe | Jan. 13, 1931 |
| 1,794,459 | Huber | Mar. 3, 1931 |